United States Patent [19]

Barabino et al.

[11] 4,266,633
[45] May 12, 1981

[54] BRAKE WEAR WARNING SYSTEM

[75] Inventors: William A. Barabino, North Reading; Edward J. Cook, South Hamilton, both of Mass.

[73] Assignee: Safety Research & Engineering Corporation, N. Reading, Mass.

[21] Appl. No.: 18,449

[22] Filed: Mar. 8, 1979

[51] Int. Cl.³ .............................................. F16D 66/02
[52] U.S. Cl. ................................. 188/1 A; 340/52 A
[58] Field of Search ........................ 116/208; 188/1 A; 340/52 A, 58

[56] References Cited

U.S. PATENT DOCUMENTS

| | | | |
|---|---|---|---|
| 1,696,985 | 1/1929 | Trbojevich | 188/1 A X |
| 2,882,363 | 4/1959 | Cordell | 340/58 X |
| 3,593,266 | 7/1971 | Van Sickle | 188/1 A X |
| 4,075,603 | 2/1978 | Snyder et al. | 340/58 |
| 4,084,671 | 4/1978 | Ternehall | 188/1 A X |

Primary Examiner—Duane A. Reger
Attorney, Agent, or Firm—Morse, Altman, Oates & Dacey

[57] ABSTRACT

A system is provided for indicating excessive wear of brake linings. The system is usable on vehicles such as automobiles, cars, trucks and busses as well as aircraft or other applications where it is desirable to detect excessive wear of brake linings during operation thereof. The system includes an acoustical signal generating device having an air inlet normally closed by the brake lining. When the lining wears away to a minimum safe thickness, the inlet is opened and ambient air flows into the generator to produce an acoustical signal. An acoustical receiver is positioned in spaced operative relation to the brake system and responds to the acoustical signal to provide a warning indication on the dashboard, for example, of the vehicle so that the operator of the vehicle will be alerted to the worn brake condition.

5 Claims, 12 Drawing Figures

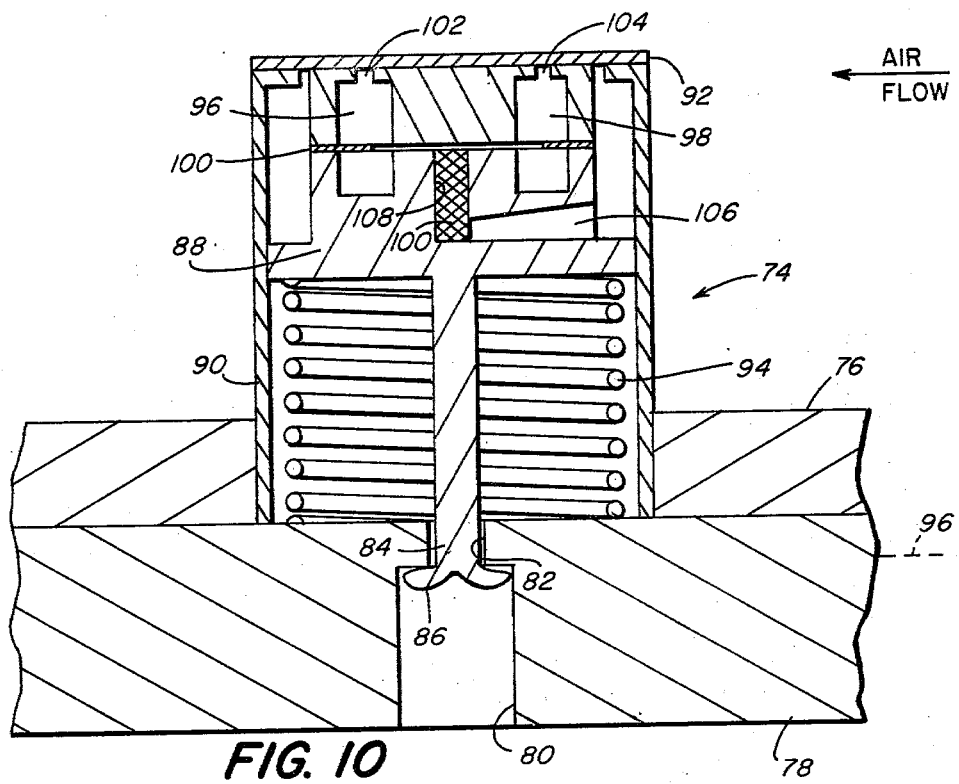
FIG. 10
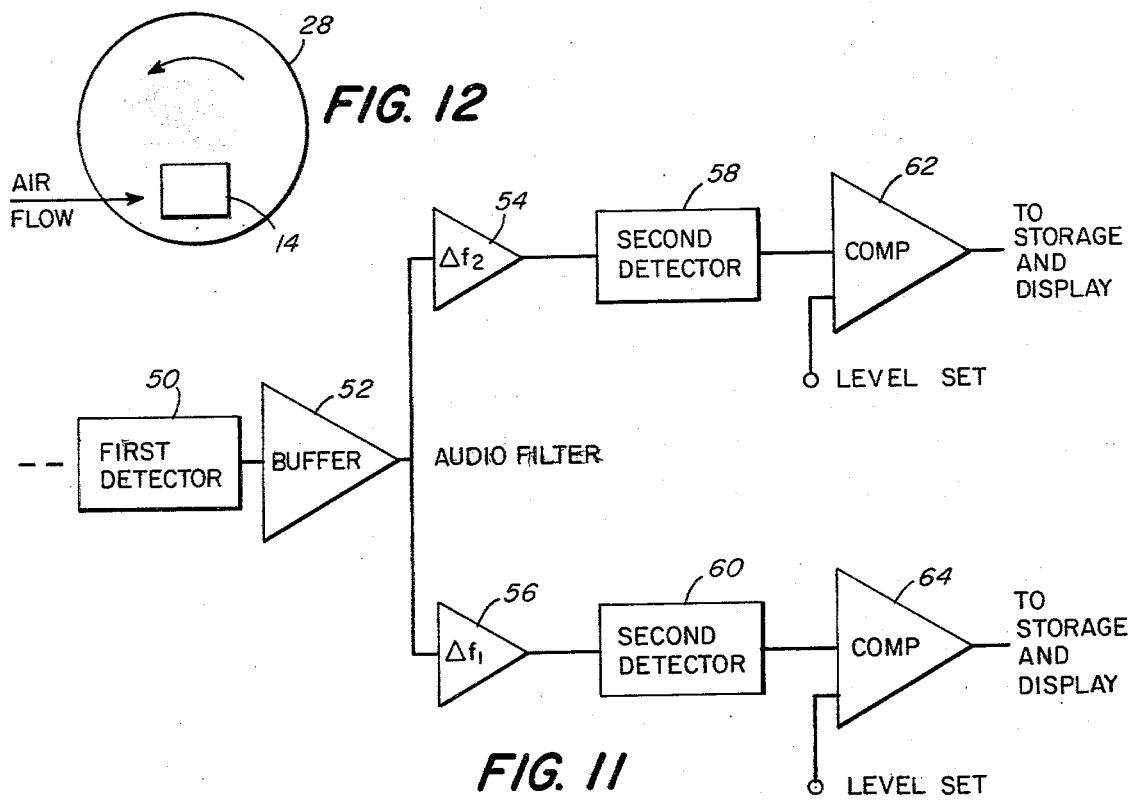
FIG. 12
FIG. 11

4,266,633

BRAKE WEAR WARNING SYSTEM

BACKGROUND OF THE INVENTION

1. Field of the Invention

This invention relates generally to brake wear warning systems and more particularly is directed towards a new and improved system for automatically detecting excessive brake wear and generating a warning signal to the operator of the vehicle when such wear occurs.

2. Description of the Prior Art

A typical brake system such as used on motor vehicles comprises a member that rotates with the wheel and usually is in the form of a drum or disc. Brake linings attached to shoes or calipers are adapted upon actuation to engage the drum or disc to provide braking action to the wheel. After a period of use the linings will wear down and, unless replaced in a timely manner, will no longer provide proper braking action. If the linings become worn to an excessive degree so as to expose metal brake parts, metal-to-metal contact will take place between the drum and the pads or shoes which will cause serious damage, such as scoring of the brake drum or disc. Loss of braking capability can, of course, be dangerous to the occupants, particularly in an emergency situation.

While various measures have been proposed heretofore to monitor the condition of brake linings, such systems have not been satisfactory from the standpoint of simplicity, ease of installation, reliability and compatibility with related systems.

Accordingly it is an object of the present invention to provide improvements in brake wear warning systems.

Another object of this invention is to provide a brake wear warning system that is low in cost, reliable, and simple to install.

Still another object of this invention is to provide a brake wear warning system that is compatible with acoustical tire pressure warning systems whereby both systems may utilize common components.

SUMMARY OF THE INVENTION

This invention features a brake wear warning system, comprising an acoustical generator mounted at the brake lining mechanism and responsive to the flow of air therethrough. The generator includes an acoustical signalling device and a passage normally closed by the brake lining. When the brake lining is worn away, the passage opens to allow air to flow through the generator and produce a signal. An acoustical signal receiver, such as a microphone, is located in spaced proximity to the generator and is adapted to detect the acoustical signal. The microphone may also serve as part of an acoustical tire pressure warning system. Processing circuitry is connected to the receiver and an output in the form of visual or audio warning signal is provided whereby the operator of the vehicle will be alerted in the event of a dangerous brake condition.

BRIEF DESCRIPTION OF THE DRAWINGS

FIG. 10 is an enlarged detail sectional view showing still another modification of the invention, FIG. 11 is a block diagram of the signal processing circuitry used in the system, and FIG. 12 is a side view of a disc brake unit.

DETAILED DESCRIPTION OF THE PREFERRED EMBODIMENTS

Figure 1:
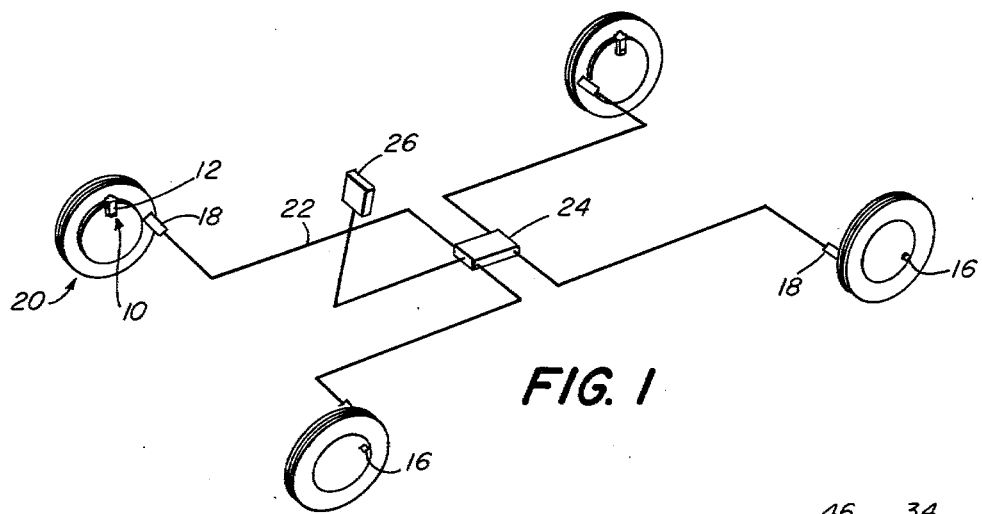
FIG. 1 is a somewhat schematic perspective view of a brake wear indicator system made according to the invention.

Referring now to the drawings and to FIG. 1 in particular, there is illustrated a system for monitoring both excessive wear on brake linings as well as tire pressure. The system includes an acoustical signal generating device 10 mounted on a brake caliper 12 for each wheel and adapted to generate an acoustical signal whenever linings or pads 14 on the caliper wear beyond a minimum safe thickness. The system, when combined with a tire pressure monitoring function, also includes an acoustical signal generator 16, mounted to each wheel and adapted to generate an acoustical signal whenever the tire pressure exceeds a predetermined value. The pressure at which a warning signal is produced may be above or below a pre-set limit, depending upon the configuration of the device. Acoustical signal generators of the sort employed herein for tire pressure applications are more fully disclosed in U.S. Pat. Nos. 3,934,223, 4,031,845, and 4,103,282, for example.

This system also includes, in the illustrated embodiment, an acoustical detection device 18 such as a microphone or the like mounted in a fixed position in close proximity to each wheel 20. Typically, the microphone will be mounted to the chassis in or near the wheel well for each wheel and is adapted to detect an acoustical signal produced by either the brake wear signal generator 10, or the tire pressure signal generator 16. The microphone 18 is connected by lead 22 to a processor 24, which, in turn, provides an output signal to display unit 26, preferably mounted on the dashboard of the vehicle and is adapted to produce an audio or visual alarm, or both, to alert the driver that the brake linings on one or more of the wheels has become excessively worn or that the pressure in one of the tires has exceeded a predetermined limit. If a sufficiently strong acoustical signal is generated, the microphone 18 may be located in a more central position under the vehicle chassis. Also, instead of one microphone for each wheel, one microphone centrally located might serve a pair of wheels.

Figure 2:
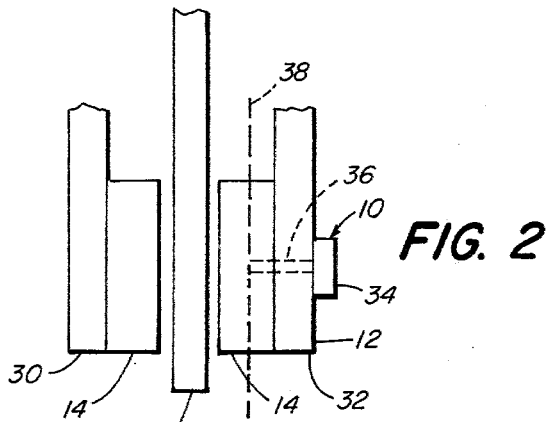
FIG. 2 is a detailed sectional view showing an acoustical generator installed in a disc brake.

Referring now more particularly to FIG. 2, there is illustrated a disc brake arrangement in which an acoustical signal generator 10 is embodied for detecting worn brake linings. As shown, the disc brake typically includes a metal brake disc 28 forming part of the wheel assembly so as to rotate with the wheel. The brake caliper 12 is mounted near the disc periphery and is provided with inwardly mounted brake pads 14, with one pad disposed on the inner face of each of two caliper arms 30 and 32.

In operation, the disc 28 will rotate with the wheel and braking action takes place by applying brake pressure to the calipers, which will cause the calipers to close from an open position, such as shown in FIG. 2, to a closed position in which the caliper arms are biased inwardly towards the disc until the pads 14 engage both sides of the disc. The pressure applied by the pads against the disc generates frictional resistance which will slow down the disc and the wheel. When brake pressure is relieved, spring means (not shown) will open the calipers so that the pads move out of contact with the disc.

Because the braking action is the result of frictional resistance between the disc, and the pads and since the pads are of a material which is softer than the disc, in time the pads will wear down to a point that replacement of the pads is required. Should the brake pads be allowed to wear away completely, the calipers 30 and 32, which normally are of metal, will come into metal-to-metal contact with the disc whenever the brakes are actuated. Metal-to-metal contact not only will cause damage, such as scoring of the brake parts, but also provides very little braking action so that operation of the vehicle under such conditions would be dangerous.

Figure 3:
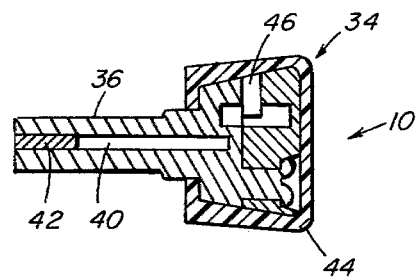
FIG. 3 is a sectional view in side elevation of an acoustical generator made according to the invention.

In the FIGS. 2 and 3 embodiment, excessive wear of the brake linings is detected by means of the acoustical signal generator 10. The generator 10 is mounted to an arm 32 of the caliper 12 and is comprised of a head portion 34 mounted to the outer face of the arm 32 and an inwardly projecting tubular stem 36 which passes through the arm 32 and partially into the brake pad 14. The inner end of the stem 36 terminates within the lining 14 at a depth corresponding to a minimum lining thickness, the plane of which is indictated by the broken line 38. When the brake lining is worn away to the minimum safe lining thickness, the end of the stem 36 is exposed allowing air to flow into it to actuate the acoustical signal generator 34. The signal is detected by the microphone 18 and processed by the unit 24 to operate the display 26. The driver is thereby alerted to the fact that the brake linings have been worn and require replacement. Sufficient lining thickness remains after the alarm that the vehicle may be operated safely for a reasonable period of time before the linings are completely worn away.

The acoustical signal generator 10 functions when a flow of air moves through a passage 40 formed in the stem 36. An acoustical device is mounted within the head 34 and, in the preferred embodiment, is similar to the slit nozzle signal generator shown in U.S. Pat. No. 4,031,845. The passage 40, which may include a filter 42, terminates within the brake pad 14 and is normally closed by the pad. However, when the brake pad wears away until it reaches the minimum safe thickness indicated by the line 38, the passage 40 is opened to allow air flow, generated by the movement of the vehicle, to pass through the passage up into the head 34. The air flowing into the head will first cause a protective cover 44 to blow off and to thereby open a port 46 through which an acoustical signal generated by the head 34 will be emitted. The acoustical signal is detected by the microphone 18 which, through the signal processor 24, will actuate an alarm at the display 26 so that the driver will be alerted as to the brake condition.

In the preferred embodiment of the invention, the generator 10 is adapted to produce a unique, two-tone acoustical signal which will be detected by the receiver 18 and processor 24. By providing a two-tone coded signal, the system is not likely to be actuated by ambient noises which might otherwise produce a false alarm. As with the tire pressure monitoring system disclosed in the prior patents, a good signal-to-noise ratio can be achieved by means of a dual tone ultrasonic signal which provides a precise difference frequency that is recognized by the processor. The selection of this difference frequency also provides a means for differentiating between a brake pad warning and a low tire pressure warning if signals from both types of sensors are to be handled by the same receiver and processor.

In the present instance, the processor 24 may be arranged as shown in FIG. 11. In the circuit of FIG. 11 the output of the microphone 18 is fed into a first detector 50 then through a buffer 52 with each of the signals then separating into two sub-channels following the first detector. Each sub channel is comprised of an audio filter for two different frequencies, filter 54 for one channel and filter 56 for the other channel. Each channel includes a second detector 58, 60 and a comparator 62, 64 providing an output to either a storage memory and/or display. If the nominal carrier difference frequency, $\Delta f1$ is 1800 Hz for the tire sub-channel, and $\Delta f2$ is 7000 Hz for the brake sub-channel, the corresponding audio filter band passes might be 1500–2500 Hz and 5500–8500 Hz, respectively. For a more complete disclosure of the acoustical coding techniques employed herein, reference is made to copending application Ser. No. 858,842, filed Dec. 8, 1977, entitled "Method and Apparatus For Monitoring Tire Pressure."

Figure 4:
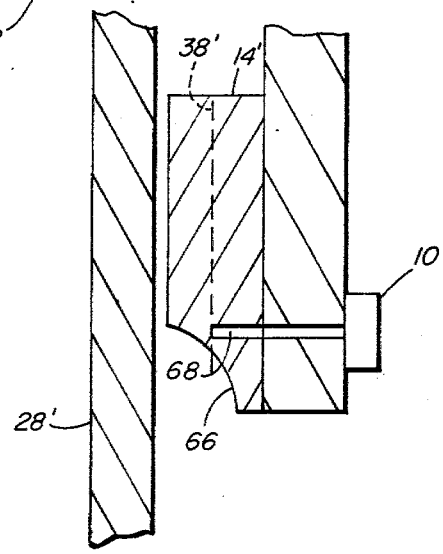
FIG. 4 is a view similar to FIG. 2 showing a modification thereof.
Figure 5:
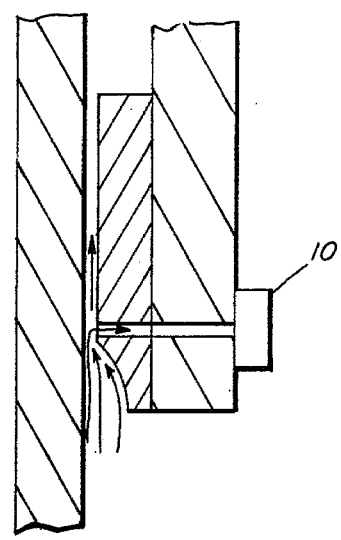
FIG. 5 is a view similar to FIG. 4 but showing the brake of FIG. 3 worn beyond a minimum safe thickness.

Referring now to FIGS. 4 and 5 there is illustrated a modification of the invention in which means are provided for enhancing the flow of air into the signal generator 10 whenever the brake pads wear beyond a minimum safe thickness. In the FIGS. 4 and 5 embodiment, the brake disc 28 and calipers, as well as the generator, are of the same construction as in the principal embodiment. However, in the modification of FIGS. 4 and 5 the leading edge of the brake pad 14, is cut away in a arc at 66 to form an air scoop. In practice, the pad is formed with a passage 68 similar to that of the principal embodiment, which passage normally is blocked by the brake lining. When the brake lining wears away to the minimum safe thickness indicated by dotted line 38, the passage 68 is opened and the scoop 66 serves to enhance the air flow into the passage, providing a greater air flow for generating a stonger acoustical signal from the generator 10.

Figure 6:
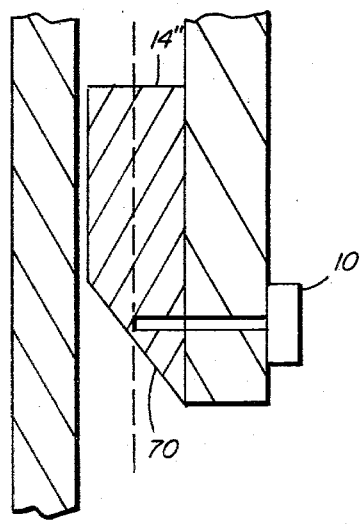
FIGS. 6 and 7 and FIGS. 8 and 9 are views similar to views FIGS. 4 and 5 showing modified brake wear arrangements with the brake linings shown in different stages of wear.
Figure 7:
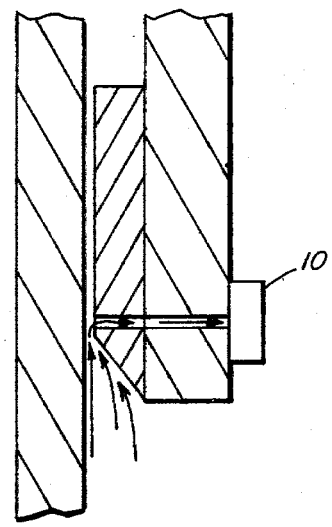

In FIGS. 6 and 7 there is illustrated another modification of the invention and, in this embodiment, the leading edge of the pad 14″ is formed with a bevelled face 70. Again, when the pad wears away beyond the minimum safe thickness, the passage to the signal generator is opened and the slope face 70 of the pad improves the flow of air into the passage.

Figure 8:
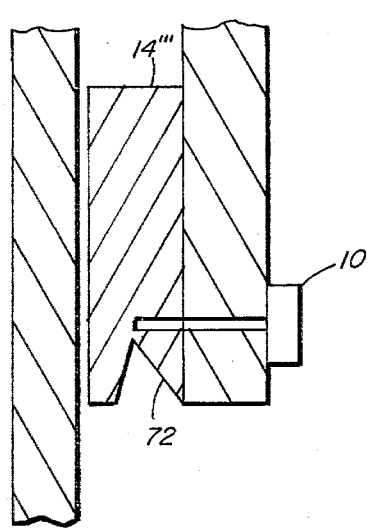
Figure 9:
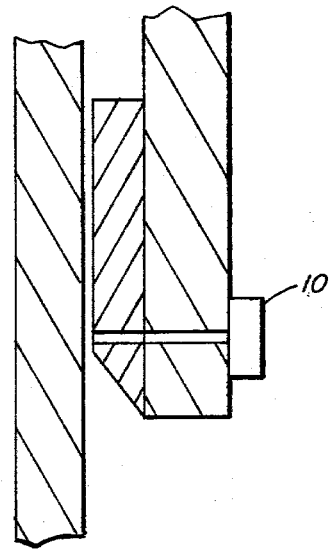

In FIGS. 8 and 9 there is still another modification of the invention and, in this instance, the leading edge of the pad 14‴ is formed with a wedge-shaped notch 72. The notch configuration maintains the same braking surface for the pad whereas when the pad wears away beyond the minimum safe thickness the bevelled face again enhances the flow of air into the passage to drive the acoustical signal generator.

Referring now more particularly to FIG. 10, there is illustrated yet another modification of the invention and, in this embodiment, an acoustical signal generator 74 is mounted on a brake shoe 76 or caliper on the working face of which is applied a typical brake lining 78. The lining 78 is formed with a recess 80 having a reduced passage 82 through which a stem 84 extends and terminates in a swedged retainer 86. The stem 84 is connected to an acoustical signal generator device 88 mounted in a cover 90 which in turn is mounted to the brake shoe or caliper, depending upon the brake type. The whistle 88 normally is mounted entirely within the cover 90 with the outer end of it being covered by a frangible lid 92. A compressed coil spring 94 is mounted between the whistle 88 and the brake lining or brake shoe.

The whistle 88 is formed with a pair of cavities 96 and 98 in which a diaphragm 100 is mounted to form slit nozzles of the sort shown in U.S. Pat. No. 4,031,845. Output ports 102 and 104 are formed at the upper ends of the cavities and are normally closed by the lid 92. Air is delivered to the cavities from an air scoop 106 and a passage 108 in which is mounted a filter 110.

The device operates in the following manner. Once the brake lining 78 wears beyond a minimum safe thickness, indicated by the broken line 96, the brake drum or disc will quickly wear away the swedged retainer 86, releasing the stem 84 and allowing the spring 94 to force the whistle head 88 through the frangible cover 92 into an exposed position. Once the whistle is exposed, the air flow from the motion of the vehicle will feed in through the scoop 106 to actuate the whistle, which in turn will be picked up by the microphone and processed, as before.

While the invention has been described with particular reference to the illustrated embodiments, numerous modifications thereto will appear to those skilled in the art.

Having thus described the invention, what we claim and desire to obtain by Letters Patent of the United States is:

1. A brake wear warning system for use on a wheeled vehicle equipped with brakes in which the brakes include at least one rotatable brake member and at least one relatively fixed element mounted for limited movement to and away from said member, said element provided with a lining adapted to frictionally engage said member upon actuation of said element, comprising
   (a) an acoustical signal generator mounted to said element and adapted to produce an acoustical signal when a flow of ambient air passes therethrough,
   (b) ambient air flow control means connected to said generator and to said lining,
   (c) said means adapted to open said generator to the flow of ambient air when said lining has worn to a predetermined thickness, said flow of air produced by the motion of said vehicle,
   (d) detector means mounted to said vehicle for sensing an acoustical signal from said generator and producing an electrical signal therefrom,
   (e) electrical signal processing means connected to said detector means, and,
   (f) alarm means connected to said processing means for alerting the operator of said vehicle.

2. A brake wear warning system according to claim 1 wherein said means includes a passage formed through said element and into said lining to a predetermined depth said passage being normally closed by said lining and opened when said lining has worn to said predetermined depth.

3. A brake wear warning system for use on a wheeled vehicle equipped with brakes in which the brakes include at least one rotatable brake member and at least one relatively fixed element mounted for limited movement to and away from said member, said element provided with a lining adapted to frictionally engage said member upon actuation of said element, comprising
   (a) an acoustical signal generator mounted to said element and adapted to produce an acoustical signal when a flow of air passes therethrough;
   (b) air flow control means connected to said generator and to said lining,
   (c) said means adapted to open said generator to the flow of air when said lining has worn to a predetermined thickness,
   (d) detector means mounted to said vehicle for sensing an acoustical signal from said generator and producing an electrical signal therefrom,
   (e) electrical signal processing means connected to said detector means,
   (f) alarm means connected to said processing means for alerting the operator of said vehicle,
   (g) said means including a cover normally enclosing said generator, one of said generator and said cover being relatively movable to one another,
   (h) spring means engaging said one of said generator and said cover, and,
   (i) coupling means connected to said lining at a predetermined depth and to said spring means, said coupling means adapted to be released when said lining has worn to said predetermined depth whereby said spring means will move one of said generator and said cover to expose said generator to the flow of air.

4. A brake wear warning system according to claim 3 wherein said cover is mounted in fixed position and said generator is mounted for reciprocating movement in and out of said cover, said spring means engaging said generator and normally urging said generator out of said cover, said coupling means including a stem extending from said generator into said lining, said stem being formed with an enlarged end portion disposed within said lining and adapted to be worn away when said lining is worn to a minimum safe thickness and thereby release said stem and said generator.

5. A brake wear warning system according to claim 4 wherein said generator includes a pair of slit nozzles and an air scoop connected to said nozzles for actuating said nozzles when said generator is exposed to the flow of air upon release of said stem.

* * * * *